United States Patent
Tang et al.

(10) Patent No.: US 9,989,789 B2
(45) Date of Patent: Jun. 5, 2018

(54) SYSTEM, METHOD, AND DEVICE FOR CONTROLLING ADHESION

(71) Applicant: Xiaomi Inc., Beijing (CN)

(72) Inventors: Hengjun Tang, Beijing (CN); Shasha Shi, Beijing (CN); Shaoxing Hu, Beijing (CN)

(73) Assignee: Xiaomi Inc., Beijing (CN)

(*) Notice: Subject to any disclaimer, the term of this patent is extended or adjusted under 35 U.S.C. 154(b) by 0 days. days.

(21) Appl. No.: 15/054,262

(22) Filed: Feb. 26, 2016

(65) Prior Publication Data
US 2016/0291356 A1    Oct. 6, 2016

(30) Foreign Application Priority Data
Mar. 30, 2015    (CN) .......................... 2015 1 0146179

(51) Int. Cl.
| | |
|---|---|
| *B32B 37/18* | (2006.01) |
| *G02F 1/13* | (2006.01) |
| *B32B 37/00* | (2006.01) |
| *B32B 38/18* | (2006.01) |
| *B32B 37/10* | (2006.01) |

(Continued)

(52) U.S. Cl.
CPC .......... *G02F 1/1303* (2013.01); *B32B 37/003* (2013.01); *B32B 37/0046* (2013.01); *B32B 37/10* (2013.01); *B32B 38/1841* (2013.01); *G02F 1/13338* (2013.01); *B32B 37/12* (2013.01); *B32B 2309/14* (2013.01); *B32B 2309/68* (2013.01); *B32B 2309/72* (2013.01);
(Continued)

(58) Field of Classification Search
CPC .............. G02F 1/1303; G02F 1/13338; G02F 2202/28; B32B 37/003; B32B 37/0046; B32B 37/10; B32B 38/1841; B32B 37/12; B32B 2309/14; B32B 2309/68; B32B 2309/72; B32B 2457/202; B32B 2457/208
See application file for complete search history.

(56) References Cited

U.S. PATENT DOCUMENTS

| | | | |
|---|---|---|---|
| 2014/0116598 A1 | 5/2014 | Lee | |
| 2014/0299276 A1* | 10/2014 | Uemura | B29C 66/92 156/582 |

FOREIGN PATENT DOCUMENTS

| | | |
|---|---|---|
| CN | 101795849 A | 8/2010 |
| CN | 103029409 A | 4/2013 |

(Continued)

OTHER PUBLICATIONS

Extended Search Report for European Application No. 16151314.8 from the European Patent Office, dated Aug. 25, 2016.
(Continued)

*Primary Examiner* — George Koch
(74) *Attorney, Agent, or Firm* — Finnegan, Henderson, Farabow, Garrett & Dunner LLP

(57) ABSTRACT

A system for controlling adhesion between a touch panel (TP) and a liquid crystal display (LCD). The system includes a controlling module, an adhering roller, and a limiting device. The controlling module is configured to determine a first moving speed of the adhering roller and a second moving speed of the limiting device. The adhering roller is configured to roll along a first direction from a first side of the TP to a second side of the TP at the first moving speed. The limiting device is configured to move along a second direction at the second moving speed and prevent the TP from moving with respect to the LCD.

10 Claims, 4 Drawing Sheets

(51) Int. Cl.
    *G02F 1/1333*     (2006.01)
    *B32B 37/12*     (2006.01)

(52) U.S. Cl.
    CPC ... *B32B 2457/202* (2013.01); *B32B 2457/208* (2013.01); *G02F 2202/28* (2013.01)

(56) References Cited

FOREIGN PATENT DOCUMENTS

| | | | |
|---|---|---|---|
| CN | 103879587 A | 6/2014 | |
| CN | 104691086 A | 6/2015 | |
| JP | 2013080046 A | 5/2013 | |
| KR | 101190992 B1 | 10/2012 | |

OTHER PUBLICATIONS

*One Glass Solution*, Wikipedia, dated Mar. 11, 2015, retrieved from http://web.archive.org/web/2015031113339/http:l/en.wikipedia.org/wiki/One_Glass_Solution, dated Aug. 17, 2016.
Office Action dated Mar. 15, 2016, in counterpart Chinese Application No. 201510146179.6 and English translation thereof.
English version of International Search Report of PCT Application No. PCT/CN2015/093414, dated Feb. 5, 2016, issued by the ISA/CN—State Intellectual Property Office of the P.R. China.
Notification of Reasons for Refusal in counterpart Japanese Application No. 2017-508744, dated Jun. 14, 2017.

\* cited by examiner

SYSTEM, METHOD, AND DEVICE FOR CONTROLLING ADHESION

CROSS-REFERENCE TO RELATED APPLICATION

This application is based upon and claims priority to Chinese Patent Application 201510146179.6, filed on Mar. 30, 2015, the entire content of which is incorporated herein by reference.

TECHNICAL FIELD

The present disclosure generally relates to the field of electronic product manufacturing technology, and more particularly, to a system, method and device for controlling adhesion.

BACKGROUND

Along with increasing demands on optical property of display for a smart phone, it has been more and more popular to adhere a touch panel (TP) and a liquid crystal display (LCD) by an optical bonding process. In the related art, after aligning a view area (VA) of the TP with an active area (AA) of LCD, a machine for holding the LCD is maintained still, and the TP adhered with an optical clear adhesive (OCA) is moved by a mechanical hand to be above the LCD. Then, the adhesion between the TP and the LCD is performed in a vacuum metal cavity.

During adhering the TP to the LCD in the vacuum metal cavity, as the TP is not fixed by a fixing device, relative movement between the TP and the LCD occurs along an X or Y direction in the vacuum state. Besides, in order to completely discharge bubbles between the TP and the LCD, it requires a certain amount of additional time to make the metal cavity in the vacuum state, resulting in low productivity.

SUMMARY

In order to overcome a problem existing in the related art, the present disclosure provides a system, method and device for controlling adhesion, so as to effectively discharge bubbles between a TP and a LCD, and thereby preventing relative movement between the TP and the LCD during adhesion.

According to a first aspect of embodiments of the present disclosure, there is provided a system for controlling adhesion between a touch panel (TP) and a liquid crystal display (LCD). The system for controlling adhesion includes: a controlling module, an adhering roller, and a limiting device. The controlling module is configured to determine a first moving speed of the adhering roller and a second moving speed of the limiting device. The adhering roller is configured to roll along a first direction from a first side of the TP to a second side of the TP at the first moving speed. The limiting device is configured to move along a second direction at the second moving speed and to prevent the TP from moving with respect to the LCD.

According to a second aspect of embodiments of the present disclosure, there is provided a device for controlling adhesion between a touch panel (TP) and a liquid crystal display (LCD). The device may include: a processor; and a memory for storing instructions executable by the processor. The processor is configured to: determine a first moving speed of an adhering roller and a second moving speed of a limiting device; control the adhering roller to roll along a first direction from a first side to a second side of the TP at the first moving speed; and control the limiting device to move along a second direction at the second moving speed, the limiting device preventing the TP from moving with respect to the LCD.

According to a third aspect of embodiments of the present disclosure, there is provided a non-transitory computer-readable storage medium having stored therein instructions that, when executed by a processor of a device, cause the device to perform a method for controlling adhesion between a touch panel (TP) and a liquid crystal display (LCD). The method includes: determining a first moving speed of an adhering roller and a second moving speed of a limiting device; controlling the adhering roller to roll along a first direction from a first side of the TP to a second side of the TP at the first moving speed; and controlling the limiting device to move along a second direction at the second moving speed, the limiting device preventing the TP from moving with respect to the LCD.

According to embodiments of the present disclosure, the technical solution may have the following advantageous effects. The adhering roller is rolled from the first side to the second side of the TP, so as to discharge bubbles between the TP and the LCD, thus increasing an adhesion speed of the optical bonding process. The TP is limited by the limiting device during the entire adhesion process, thus preventing relative movement between the TP and the LCD to ensure adhering accuracy, and thereby improving adhesion productivity to a great extend under limited plant and equipment investment.

It is to be understood that both the foregoing general description and the following detailed description are illustrative and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to the disclosure as recited in the appended claims.

Figure 1A:
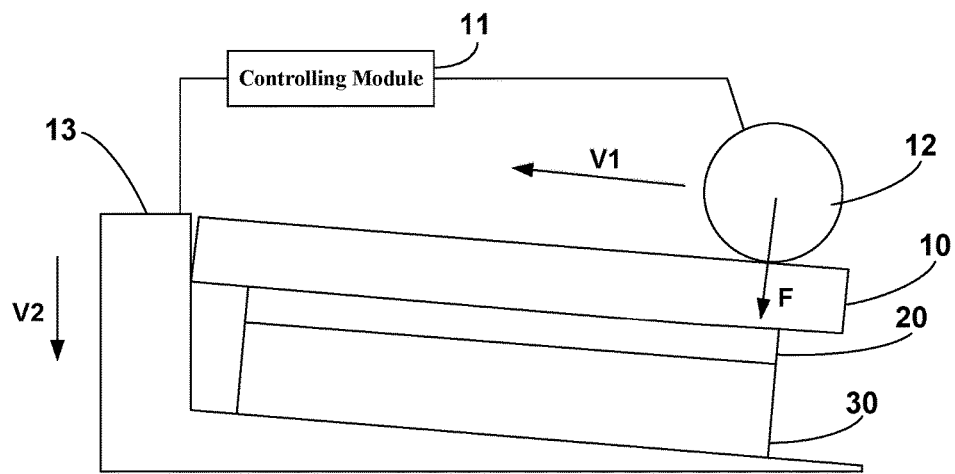
FIG. 1A is a schematic diagram showing a side view of a system for controlling adhesion, according to an illustrative embodiment.
Figure 1B:
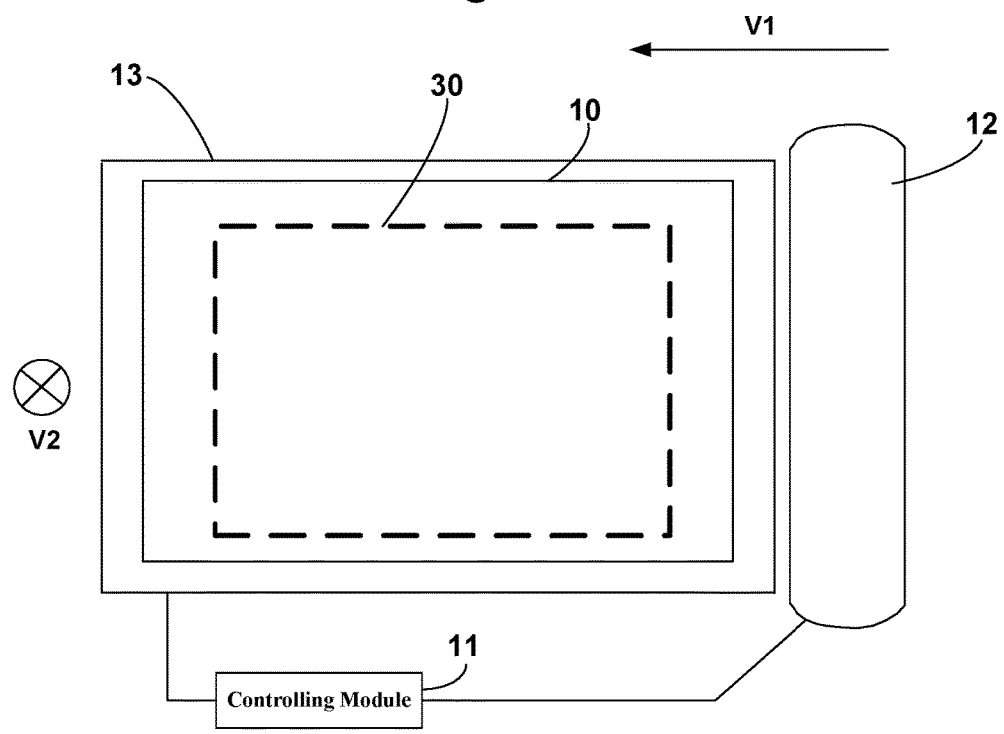
FIG. 1B is a schematic diagram showing a top view of the a system of FIG. 1A for controlling adhesion, according to the illustrative embodiment.
Figure 1C:
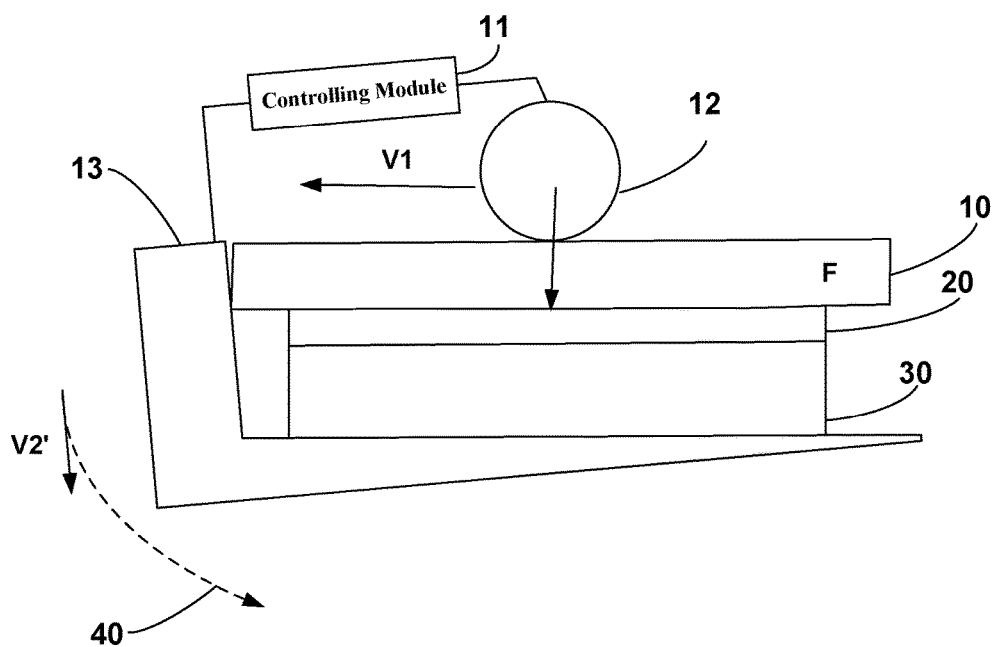
FIG. 1C is a schematic diagram showing a side view of the system of FIG. 1A at another moving moment, according to an illustrative embodiment.

FIG. 1A is a schematic diagram showing a side view of a system for controlling adhesion, according to an illustrative embodiment. FIG. 1B is a schematic diagram showing a top view of the system of FIG. 1A for controlling adhesion, according to the illustrative embodiment. FIG. 1C is a schematic diagram showing a side view of the system of FIG. 1A at another moving moment, according to an illustrative embodiment. As shown in FIGS. 1A and 1B, after a touch panel (TP) 10 and a liquid crystal display (LCD) 30 are aligned, the TP 10 may be moved by a mechanical hand to be above the LCD 30, and the TP 10 is adhered to the LCD 30 with an optical clear adhesive (OCA) 20 at a predetermined adhering angle, thus facilitating the adhesion. The system for controlling adhesion includes: a controlling module 11, an adhering roller 12, and a limiting device 13.

The controlling module 11 is configured to determine a first moving speed $V_1$ of the adhering roller 12 and a second moving speed $V_2$ of the limiting device 13.

The adhering roller 12 is configured to roll along a first direction (indicated by an arrow direction of $V_1$ which is parallel to a major surface of the TP 10) from a first side to a second side of the TP 10 at the first moving speed $V_1$. In an embodiment, the controlling module 11 controls a rotation speed of a first stepping motor (not shown), so as to control the adhering roller 12 to roll at the first moving speed $V_1$.

The limiting device 13 is configured to move along a second direction (indicated by an arrow direction of $V_2$ which is parallel to a side wall of the limiting device 13) at the second moving speed $V_2$ and limit the movement of the TP 10 with respect to the LCD 30, so as to prevent the TP 10 from moving with respect to the LCD 30. In an embodiment, the controlling module 11 controls a rotation speed of a second stepping motor (not shown), so as to control the limiting device 13 to move at the second moving speed $V_2$.

FIG. 1A merely illustratively indicates that the arrow direction of $V_2$ is of a vertical direction at the very moment shown as FIG. 1A. It would be appreciated by those skilled in the art that the moving direction of the limiting device 13 is variable, and the limiting device 13 can move along an inclined direction with respect to the vertical direction at other moving moments. That is, the limiting device 13 is configured to dynamically adjust its moving direction in accordance with the movement of the adhering roller 12. For example, as illustrated in FIG. 1C, when the adhering roller 12 rolls along the first direction (indicated by an arrow direction of $V_1$), the limiting device 13 moves along an arrow direction of $V_2'$ which is a tangential direction along an arc 40 corresponding to a moving path of the limiting device 13. In another word, the second moving direction may be a tangential direction.

In the present embodiment, the adhering roller 12 is rolled along the first direction from the first side to the second side of the TP10, so as to discharge bubbles between the TP 10 and the LCD 30, and thereby improving an adhesion speed of an optical bonding process. The TP 10 is limited by the limiting device 13 during the entire adhesion process, thus preventing relative movement between the TP 10 and the LCD 30 to ensure adhering accuracy, and thereby improving adhesion productivity to a great extend under limited plant and equipment investment.

In an embodiment, the limiting device 13 may include: a limiting portion, configured to prevent the TP 10 from moving with respect to the LCD 30; and a supporting portion, having a supporting surface at a predetermined angle with respect to a horizontal plane. The LCD 30 is supported on the supporting surface. The limiting device 13 is configured to move along the second direction at the second moving speed $V_2$, so as to enable the supporting surface and the LCD 30 to become horizontal from the predetermined angle.

In an embodiment, the controlling module 11 may include: an acquiring sub-module configured to acquire the predetermined angle with respect to the horizontal plane; and a speed controlling sub-module configured to control the adhering roller 12 to move at the first moving speed $V_1$ and the limiting device 13 to move at the second moving speed $V_2$ in accordance with a sine value of the predetermined angle. The acquiring sub-module and the speed controlling sub-module may be implemented by one or more processors and one or more memories storing instructions executed by the one or more processors.

In an embodiment, the first moving speed $V_1$ and the second moving speed $V_2$ satisfy the following equation:

$$V_2/V_1 = \sin\alpha,$$

wherein $V_1$ represents the first moving speed, $V_2$ represents the second moving speed, and $\alpha$ represents the predetermined angle.

In an embodiment, the system further includes an air pressure regulating valve configured to apply force on two axial ends of the adhering roller 12, so as to adjust force (indicated as F) applied by the adhering roller 12 along a direction vertical to the TP 10 under control of the controlling module 11.

According to embodiments of the present disclosure, the above described system may discharge bubbles between the TP 10 and the LCD 30, thus improving an adhesion speed of the optical bonding process, preventing relative movement between the TP 10 and the LCD 30 during adhering the TP 10 and the LCD 30 to ensure adhering accuracy, and thereby improving adhesion productivity to a great extend under limited plant and equipment investment.

Figure 2A:
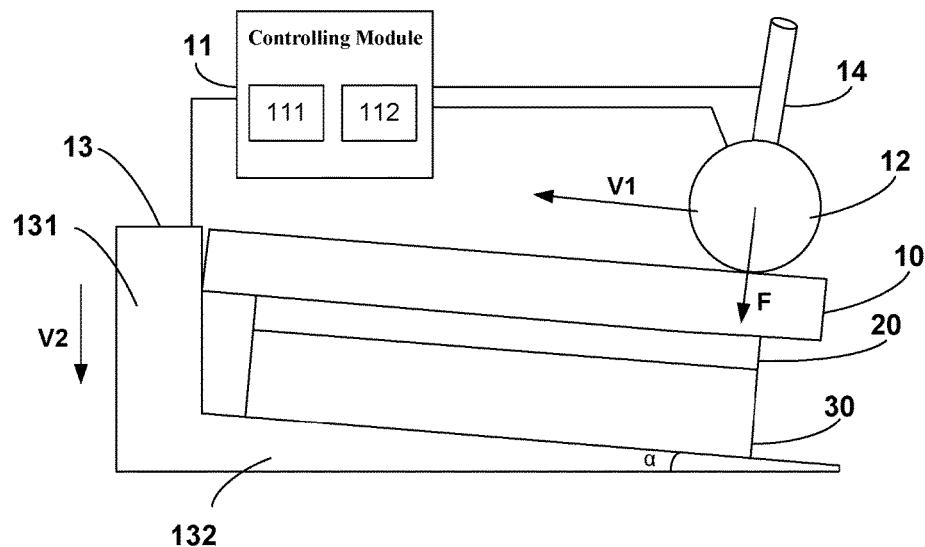
FIG. 2A is a schematic diagram showing a side view of a system for controlling adhesion, according to an illustrative embodiment.
Figure 2B:
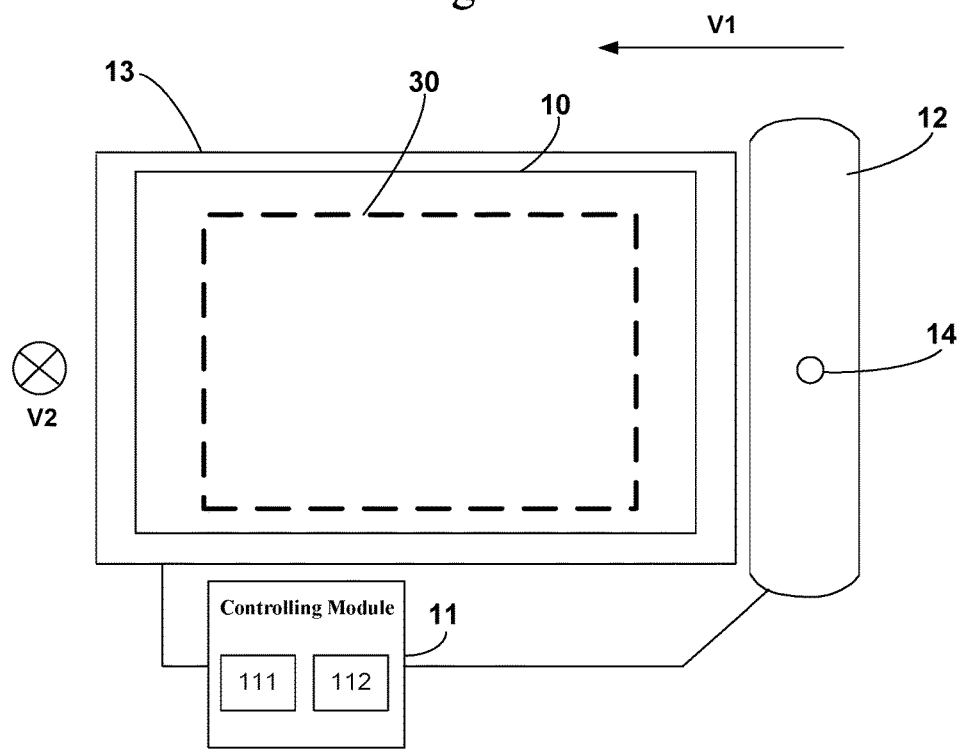
FIG. 2B is another schematic diagram showing a top view of the system of FIG. 2A for controlling adhesion, according to the illustrative embodiment.

FIG. 2A is a schematic diagram showing a side view of a system for controlling adhesion, according to an illustrative embodiment. FIG. 2B is a schematic diagram showing a top view of the system of FIG. 2A for controlling adhesion, according to the illustrative embodiment. The embodiment illustrated in FIGS. 2A and 2B is based on the above embodiment illustrated in FIGS. 1A and 1B. As shown in FIGS. 2A and 2B, the limiting device 13 includes: a limiting portion 131 configured to prevent the TP 10 from moving with respect to the LCD 30; and a supporting portion 132 having a supporting surface at a predetermined angle with respect to a horizontal plane (indicated as $\alpha$), the LCD 30 being supported on the supporting surface. The limiting device 13 is configured to move along the second direction at the second moving speed $V_2$, so as to enable the supporting surface and the LCD 30 to become horizontal.

In an embodiment, the controlling module 11 may include: an acquiring sub-module 111 configured to acquire the predetermined angle with respect to the horizontal plane; and a speed controlling sub-module 112 configured to control the adhering roller 12 to move at the first moving speed $V_1$ and the limiting device 13 to move at the second moving speed $V_2$ in accordance with a sine value of the predetermined angle α acquired by the acquiring sub-module 111. The acquiring sub-module 111 and the speed controlling sub-module 112 may be implemented by one or more processors and one or more memories storing instructions executed by the one or more processors.

The predetermined angle is not limited by examples of the present disclosure, may be set in accordance with a material of the OCA 20, and the thicknesses of the TP 10 and the LCD 30.

In an embodiment, the first moving speed $V_1$ and the second moving speed $V_2$ satisfy the following equation:

$$V_2/V_1 = \sin α,$$

wherein $V_1$ represents the first moving speed, $V_2$ represents the second moving speed, and α represents the predetermined angle.

The first moving speed $V_1$ and the second moving speed $V_2$ are adjusted to be in conformity with the above equation $V_2/V_1 = \sin α$, so as to ensure the entire TP 10 being evenly rolled by the adhering roller 12 when the adhering roller 12 rolls along the first direction from a first side of the TP 10 (e.g., the right side in FIGS. 2A and 2B) to a second side of the TP 10. After the supporting surface of the supporting portion 132 gradually becomes horizontal from the predetermined angle α, the TP 10 and the LCD 30 may be maintained horizontal after being adhered, which can prevent the TP 10 and the LCD 30 from deformation induced by an external irregular pressure.

In an embodiment, the system for controlling adhesion may further include: an air pressure regulating valve 14 configured to apply force on two axial ends of the adhering roller 12, so as to enable the entire adhering roller 12 to be evenly stressed along an axial direction of its own, and to adjust the force applied by the adhering roller 12 along a direction vertical to the TP 10 under the control of the controlling module 11. As shown in FIG. 2A, the force applied by the adhering roller 12 along the direction vertical to the TP 10 is of an arrow direction shown as F. The force (shown as F) applied by the adhering roller 12 onto the TP 10 may be adjusted by the air pressure regulating valve 14. In an embodiment, the air pressure regulating valve 14 may adjust the force to be capable of discharging the bubbles between the TP 10 and the LCD 30 without inducing deformation to the TP 10.

A position at which the air pressure regulating valve 14 is located is not limited by the embodiments of the present disclosure, i.e., the air pressure regulating valve 14 may be arranged in the middle of the adhering roller 12 (illustratively shown in FIG. 2B), or disposed at two ends of the adhering roller 12 (not shown), as long as it may enable the adhering roller 12 to be evenly stressed along the axial direction of its own.

In an embodiment, on the basis of the advantageous technical effect of the above embodiments, the system for controlling adhesion may allow the supporting surface of the supporting portion 132 to become horizontal from the predetermined angle, so as to enable the TP 10 and the LCD 30 to be maintained horizontal after being adhered, and thus preventing the TP 10 and the LCD 30 from deformation induced by an external irregular pressure. The force may be adjusted by the air pressure regulating valve 14 to be capable of discharging the bubbles between the TP 10 and the LCD 30 without inducing deformation to the TP 10.

Besides, it has been demonstrated by relevant experimental data that productivity may be increased to 180 to 200 pieces per hour by the system provided by embodiments of the present disclosure, as compared with that of 70 to 120 pieces per hour in the related art, which effectively overcomes the productivity bottle neck under limited plant and equipment investment.

Figure 3:
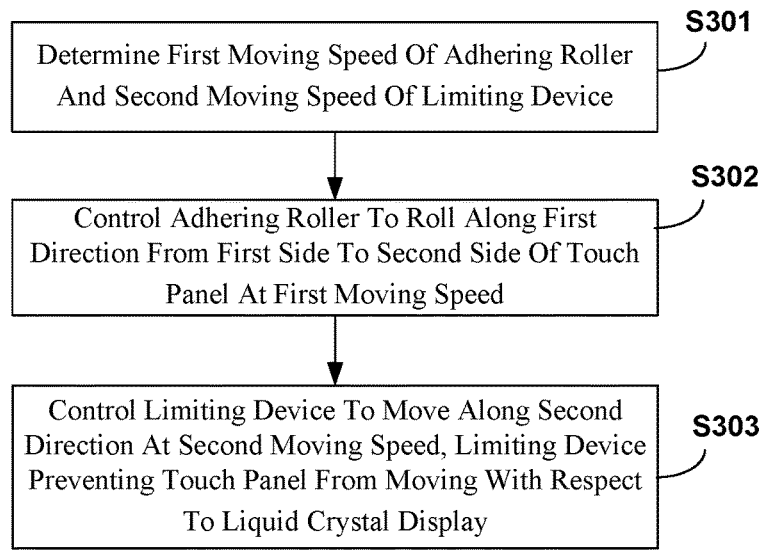
FIG. 3 is a flow chart showing a method for controlling adhesion, according to an illustrative embodiment.

FIG. 3 is a flow chart showing a method for controlling adhesion, according to an illustrative embodiment. A touch panel (TP) is adhered to a liquid crystal display (LCD) with an optical clear adhesive (OCA) at a predetermined adhering angle. As shown in FIG. 3, the method for controlling adhesion includes the following steps S301-S303.

In step S301, a first moving speed of an adhering roller and a second moving speed of a limiting device are determined.

In step S302, the adhering roller is controlled to roll along a first direction from a first side to a second side side of the TP at the first moving speed.

In step S303, the limiting device is controlled to move along a second direction at the second moving speed, the limiting device preventing the TP from moving with respect to the LCD.

In an embodiment, step S303 may include: controlling the limiting device to move along the second direction at the second moving speed, such that a limiting portion of the limiting device prevents the TP from moving with respect to the LCD. The limiting device has a supporting surface at a predetermined angle with respect to a horizontal plane, and the LCD is supported on the supporting surface, so as to enable the supporting surface to become horizontal from the predetermined angle.

In an embodiment, determining the first moving speed of the adhering roller and the second moving speed of the limiting device may include: acquiring the predetermined angle; and controlling the adhering roller to move at the first moving speed and the limiting device to move at the second moving speed in accordance with a sine value of the predetermined angle.

In an embodiment, the first moving speed and the second moving speed satisfy the following equation:

$$V_2/V_1 = \sin α,$$

wherein $V_1$ represents the first moving speed, $V_2$ represents the second moving speed, and α represents the predetermined angle.

In an embodiment, the method may further include: applying force on two axial ends of the adhering roller by an air pressure regulating valve, and adjusting force applied by the adhering roller along the direction vertical to the TP.

Regarding procedures for the method in the above embodiments, specific modes for executing various steps has been described in detail in respect with the system for controlling adhesion in the above embodiment, which are not repeated herein.

Figure 4:
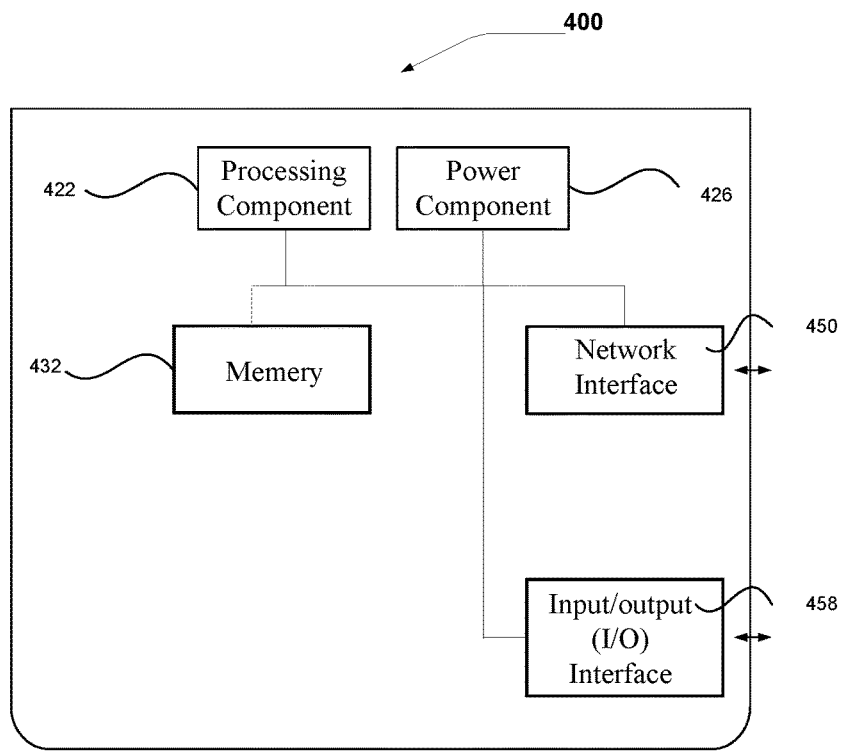
FIG. 4 is a block diagram of a device for controlling adhesion, according to an illustrative embodiment.

FIG. 4 is a block diagram of a device for controlling adhesion, according to an illustrative embodiment. For example, the device 400 may be provided as a control device, such as the controlling module 11 (FIGS. 1A, 1B, 2A, and 2B). Referring to FIG. 4, the device 400 includes a processing component 422, which further includes one or more processors, and a memory resource represented by a memory 432, for storing an instruction executable by the processing component 422, for example, application program. The application program stored in the memory 432 may include one or more modules, each corresponding to a group of instructions. Besides, the processing component 422 is configured to execute the instruction, so as to determine the first moving speed of the adhering roller and the second moving speed of the limiting device.

The device 400 may further include: a power component 426 configured to perform power management of the device 400; a wired or wireless network interface 450 configured to connect the device 400 to a network; and an input/output (I/O) interface 458. The device 400 may be operated based on an operating system stored in the memory 432, such as Windows Server™, Mac OS X™, Unix™, Linux™, FreeBSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A system for controlling adhesion between a touch panel (TP) and a liquid crystal display (LCD), comprising:
    a controlling module;
    an adhering roller; and
    a limiting device,
    wherein the controlling module is configured to determine a first moving speed of the adhering roller and a second moving speed of the limiting device,
    the adhering roller is configured to roll along a first direction from a first side of the TP to a second side of the TP at the first moving speed, and
    the limiting device includes a limiting portion and a supporting portion having a supporting surface at a predetermined angle with respect to a horizontal plane, and the limiting device is configured to move only along a second direction at the second moving speed and to prevent the TP from moving with respect to the LCD, and the second direction is different from the first direction.

2. The system of claim 1, wherein
    the limiting portion is configured to prevent the TP from moving with respect to the LCD;
    the LCD is supported on the supporting surface; and
    the limiting device is configured to move along the second direction at the second moving speed, so as to enable the supporting surface and the LCD to become horizontal from the predetermined angle.

3. The system of claim 2, wherein the controlling module comprises:
    an acquiring sub-module configured to acquire the predetermined angle; and
    a speed controlling sub-module configured to control the adhering roller to move at the first moving speed and the limiting device to move at the second moving speed in accordance with a sine value of the predetermined angle.

4. The system of claim 3, wherein the first moving speed and the second moving speed satisfy the following equation:

$$V_2/V_1 = \sin \alpha,$$

wherein $V_1$ represents the first moving speed, $V_2$ represents the second moving speed, and $\alpha$ represents the predetermined angle.

5. The system of claim 1, further comprising:
    an air pressure regulating valve configured to apply force on two axial ends of the adhering roller, so as to adjust a force applied by the adhering roller along a direction vertical to the TP under control of the controlling module.

6. A device for controlling adhesion between a touch panel (TP) and a liquid crystal display (LCD), comprising:
    a processor; and
    a memory for storing instructions executable by the processor,
    wherein the processor is configured to:
    determine a first moving speed of an adhering roller and a second moving speed of a limiting device;
    control the adhering roller to roll along a first direction from a first side of the TP to a second side of the TP at the first moving speed; and
    control the limiting device to move only along a second direction at the second moving speed, the limiting device preventing the TP from moving with respect to the LCD, wherein the limiting device includes a limiting portion and a supporting portion having a supporting surface at a predetermined angle with respect to a horizontal plane, and the second direction is different from the first direction.

7. The device according to claim 6, wherein
    the limiting portion is configured to present the TP from moving with respect to the LCD;
    the LCD is supported on the supporting surface; and
    the processor is configured to control the limiting device to move along the second direction at the second moving speed, so as to enable the supporting surface and the LCD to become horizontal from the predetermined angle.

8. The device according to claim 7, wherein the processor is further configured to:
    acquire the predetermined angle; and
    control the adhering roller to move at the first moving speed and the limiting device to move at the second moving speed in accordance with a sine value of the predetermined angle.

9. The device according to claim 8, wherein the first moving speed and the second moving speed satisfy the following equation:

$$V_2/V_1 \sin \alpha,$$

wherein $V_1$ represents the first moving speed, $V_2$ represents the second moving speed, and $\alpha$ represents the predetermined angle.

10. The device according to claim 6, wherein the processor is further configured to:
    control an air pressure regulating valve to apply force on two axial ends of the adhering roller; and
    adjust force applied by the adhering roller along a direction vertical to the TP.

* * * * *